United States Patent
Rubenchik et al.

(10) Patent No.: US 10,646,960 B2
(45) Date of Patent: May 12, 2020

(54) COMPACT ABSORPTIVITY MEASUREMENT SYSTEM FOR ADDITIVE MANUFACTURING

(71) Applicants: Alexander M. Rubenchik, Livermore, CA (US); Manyalibo Joseph Matthews, Livermore, CA (US); Johannes Trapp, Dresden (DE)

(72) Inventors: Alexander M. Rubenchik, Livermore, CA (US); Manyalibo Joseph Matthews, Livermore, CA (US); Johannes Trapp, Dresden (DE)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/723,922

(22) Filed: Oct. 3, 2017

(65) Prior Publication Data
US 2019/0099837 A1    Apr. 4, 2019

(51) Int. Cl.
*B23K 26/342*    (2014.01)
*B23K 26/352*    (2014.01)
(Continued)

(52) U.S. Cl.
CPC ........ *B23K 26/342* (2015.10); *B23K 26/0006* (2013.01); *B23K 26/034* (2013.01); *B23K 26/0626* (2013.01); *B23K 26/083* (2013.01); *B23K 26/0869* (2013.01); *B29C 64/153* (2017.08); *B29C 64/393* (2017.08); *B33Y 10/00* (2014.12); *B33Y 30/00* (2014.12); *B33Y 50/02* (2014.12); *B29C 64/255* (2017.08)

(58) Field of Classification Search
CPC .............. B23K 26/34–342; B23K 26/352–354
See application file for complete search history.

(56) References Cited

U.S. PATENT DOCUMENTS

| | | | | |
|---|---|---|---|---|
| 2003/0222066 | A1* | 12/2003 | Low | B22F 3/1055 219/121.83 |
| 2004/0254665 | A1* | 12/2004 | Fink | B29C 64/153 700/98 |
| 2014/0239552 | A1* | 8/2014 | Srinivas | C03B 33/0222 264/5 |
| 2014/0271328 | A1* | 9/2014 | Burris | B23K 26/034 419/53 |
| 2014/0368804 | A1* | 12/2014 | Lafarre | G03F 7/70416 355/72 |

(Continued)

OTHER PUBLICATIONS

Johannes Trapp et al. "In Situ Absorptivity Measurements of Metallic Powders During Laser Powder-Bed Fusion Additive Manufacturing", Applied Materials Today, vol. 9, 2017, pp. 341-349.

*Primary Examiner* — Michael A Laflame, Jr.
(74) *Attorney, Agent, or Firm* — Harness, Dickey & Pierce, PLC

(57) ABSTRACT

The present disclosure relates to a powdered bed fusion additive manufacturing (PBFAM) apparatus. The apparatus uses a container for holding a quantity of powdered material. The container has a bottom wall for supporting the powdered material, wherein the bottom wall is made from the same material as the powdered material. A temperature sensing subsystem is coupled to a portion of the container for detecting a temperature of the container. A laser generates an optical beam directed at the powdered material held by the container for melting the powdered material. A controller receives temperature information from the temperature sensing subsystem and determines an absorptivity of the powdered material based on the temperature information.

15 Claims, 4 Drawing Sheets

(51) Int. Cl.
*B23K 26/354* (2014.01)
*B23K 26/34* (2014.01)
*B33Y 10/00* (2015.01)
*B33Y 30/00* (2015.01)
*B33Y 50/02* (2015.01)
*B23K 26/06* (2014.01)
*B29C 64/393* (2017.01)
*B23K 26/03* (2006.01)
*B29C 64/153* (2017.01)
*B23K 26/08* (2014.01)
*B23K 26/00* (2014.01)
*B29C 64/255* (2017.01)

(56) References Cited

U.S. PATENT DOCUMENTS

| | | | | |
|---|---|---|---|---|
| 2015/0367415 | A1* | 12/2015 | Buller | B23K 26/346 |
| | | | | 419/53 |
| 2016/0281240 | A1* | 9/2016 | Yilbas | C23C 30/00 |
| 2016/0318128 | A1* | 11/2016 | Dutton | B23K 26/14 |
| 2017/0008125 | A1* | 1/2017 | Bruck | G01K 1/08 |
| 2017/0016839 | A1* | 1/2017 | Rubenchik | G01N 25/20 |
| 2017/0120332 | A1* | 5/2017 | Demuth | B28B 1/001 |
| 2017/0197278 | A1* | 7/2017 | Garry | B33Y 10/00 |
| 2017/0203387 | A1* | 7/2017 | Ladewig | B28B 1/001 |
| 2018/0133956 | A1* | 5/2018 | Buller | B33Y 10/00 |
| 2018/0185963 | A1* | 7/2018 | Ostroverkhov | B23K 26/342 |
| 2018/0200790 | A1* | 7/2018 | Hart | B22F 3/1055 |

\* cited by examiner

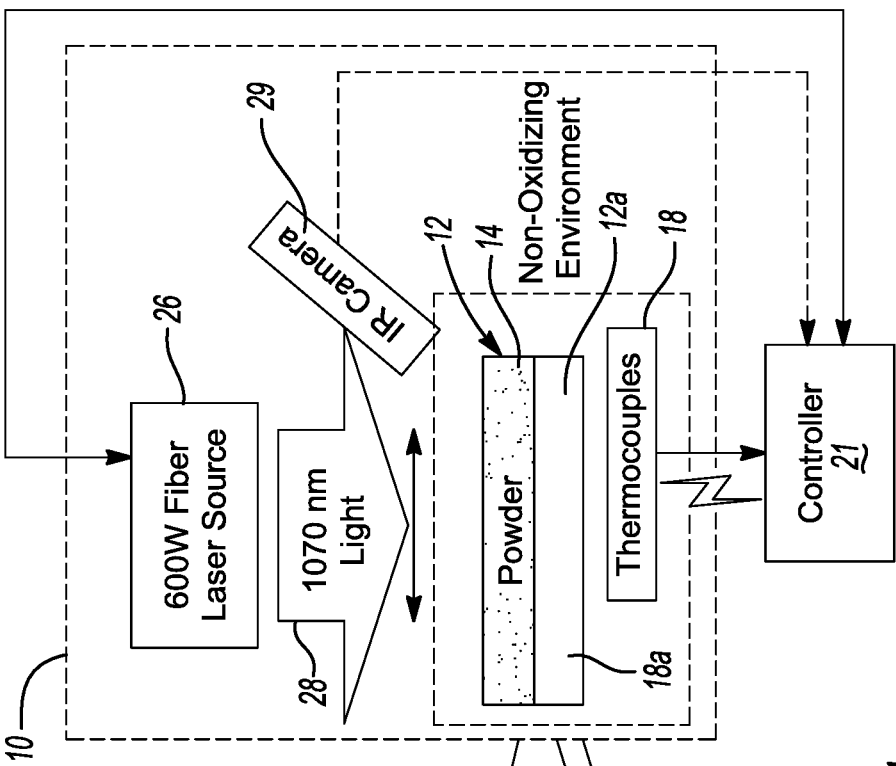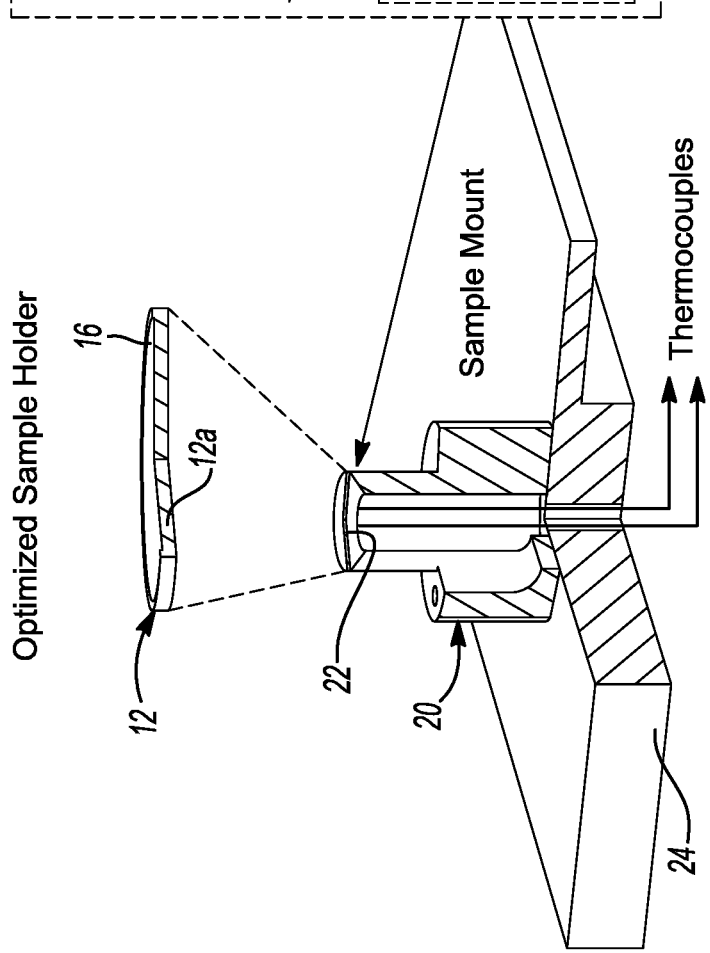
Fig-1

COMPACT ABSORPTIVITY MEASUREMENT SYSTEM FOR ADDITIVE MANUFACTURING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to additive manufacturing systems and processes, and more particularly to a system and method for monitoring absorptivity of a powdered metal being used in an additive manufacturing process.

BACKGROUND

This section provides background information related to the present disclosure which is not necessarily prior art.

A laser powder-bed fusion additive manufacturing ("PBFAM") process produces metal parts through layer-by-layer deposition of powdered metal feed materials. The design freedom afforded by this process, however, is complicated by the process complexity. It has been determined that there are over 130 different parameters that may potentially affect the part building process in a typical PBFAM process. Only the optimal selection and/or control of these parameters results in part production that is free, to an acceptable level, of defects, residual stresses and deformations.

Numerical modeling is a powerful tool to find the optimal manufacturing parameters for specific parts and materials. Today, modeling includes consideration of a plurality of highly important physical processes, for example, laser melting of the powdered material, the melt pool structure including the melt motion under the effect of capillary forces and the recoil momentum, melt evaporation of the powdered material, etc. But in practically all models, the absorption of laser light by the powdered feed material is treated as a surface one with constant absorptivity.

The powerful laser absorption by the powdered metal feed material is a complex process that is influenced by a wide variety of physical effects. The laser is capable of melting both the thin layer of powdered feed material and a substrate supporting the powdered feed material. The melt surface of the powdered feed material that the laser interacts with is in effect "non-stationary modulated" due to the melt motion, which affects the absorptivity of the powdered feed material. At higher intensities, when the recoil momentum digs out an open channel, sometimes referred to as a "key hole", light interacts with the key hole walls and ejected vapors. Consistent and accurate modeling of these complex effects is extremely difficult, if not impossible. Additionally, for the modeling of microstructure and residual stresses, one would need only the energy deposited to the substrate (i.e., the powdered metal feed material). And as part of the absorbed energy is ejected with the vapors and part of the laser light is absorbed in the vapor plume, the percentage of absorbed laser light is very difficult to model.

Yet another variable that complicates obtaining consistent performance with a PBFAM manufacturing process is the drift of various components used in the process over time. For example, thermal effects due to the optics contamination can change the laser beam parameters non-uniformly over a production table as the beam is scanned. In addition, the thickness and composition of the powdered feed material being used can change slightly from one batch of feed material to the next.

The foregoing factors all serve to make self-consistent modeling of absorptivity when performing a PBFAM manufacturing operation out of the reach of present day modeling techniques.

SUMMARY

This section provides a general summary of the disclosure, and is not a comprehensive disclosure of its full scope or all of its features.

In one aspect the present disclosure relates to a powdered bed fusion additive manufacturing (PBFAM) apparatus. The apparatus may comprise a container for holding a quantity of powdered material. The container may have a bottom wall constructed from the same material as the powdered material for supporting the quantity of powdered material thereon. A temperature sensing subsystem may be included which is coupled to a portion of the container for detecting a temperature of the container. A light source may be included which is configured to generate an optical beam directed at the powdered material held by the container, for melting the powdered material. A controller may be used which is in communication with the temperature sensing subsystem and configured to determine an absorptivity of the powdered material based on information from the temperature sensing subsystem.

In another aspect the present disclosure relates to a powdered bed fusion additive manufacturing (PBFAM) apparatus. The apparatus may comprise a container for holding a quantity of powdered material. The container may have a bottom wall for supporting the quantity of powdered material thereon, the bottom wall being constructed of the same material as the powdered material. A plurality of thermocouples may be included. The thermocouples may have portions extending into the bottom wall of the container and are adapted to sense a temperature of the container. A laser may be used which is configured to generate an optical beam directed at the powdered material held by the container, the laser beam being sufficient in intensity to melt the powdered material. A controller may be included which is in communication with the thermocouples and configured to determine an absorptivity of the powdered material based on information received from the thermocouples.

In still another aspect the present disclosure relates to a method for performing powdered bed fusion additive manufacturing (PBFAM). The method may comprise initially using a container to hold a quantity of powdered material, the container having a bottom wall for supporting the quantity of powdered material thereon. The bottom wall may be constructed of the same material as the powdered material. The method may further include directing an optical beam at the powdered material held by the container, which is sufficient in temperature to melt the powdered material. The method further involves, while the powdered material is being melted, sensing a temperature of a portion of the container, and using the sensed temperature to determine an absorptivity of the powdered material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a high level block diagram of a system in accordance with one embodiment of the present disclosure that may be used to monitor and evaluate the absorptivity of powdered feed material when performing a PBFAM manufacturing operation, as well as control an output power of a light source being used with the process;

Figure 3:
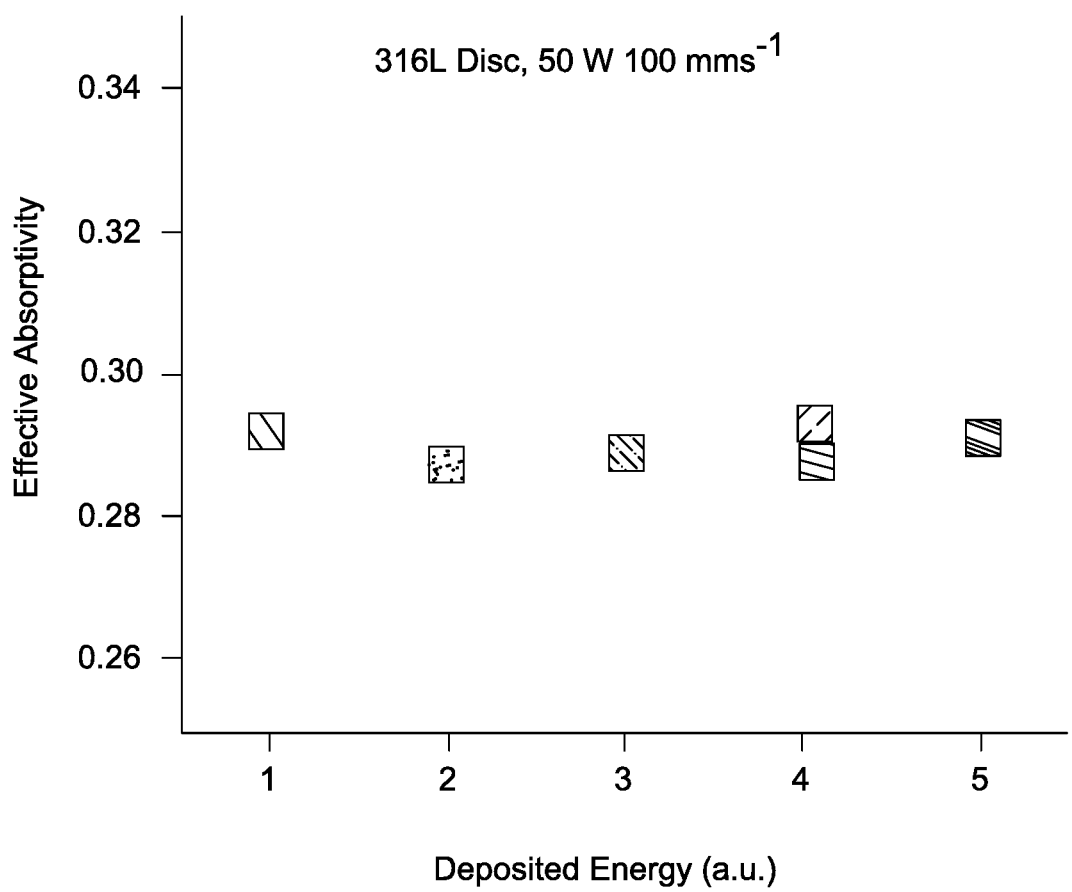
FIG. 3 is a graph showing example absorptivity measurements corresponding to different tracks of the laser of FIG. 1, and further illustrating effective absorptivity vs. deposited energy for different tracks and groups of tracks.
Figure 3A:
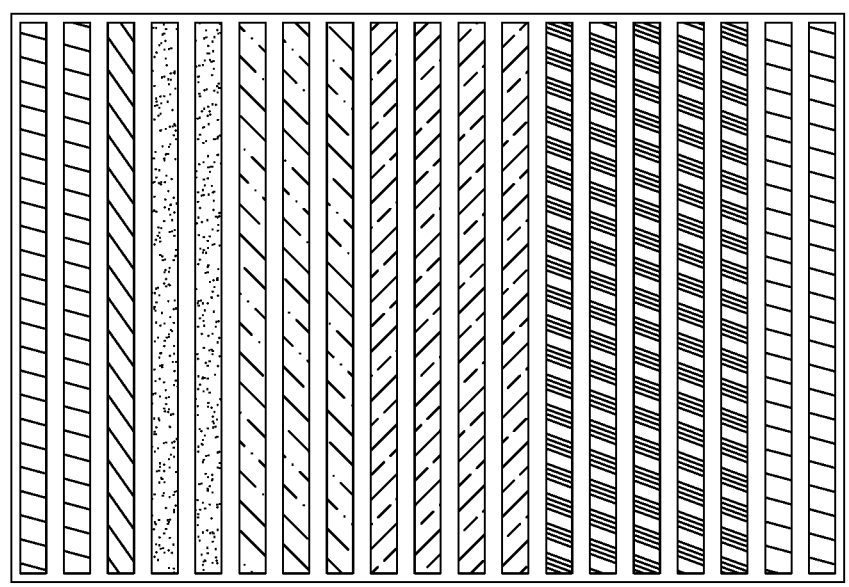
Figure 4:
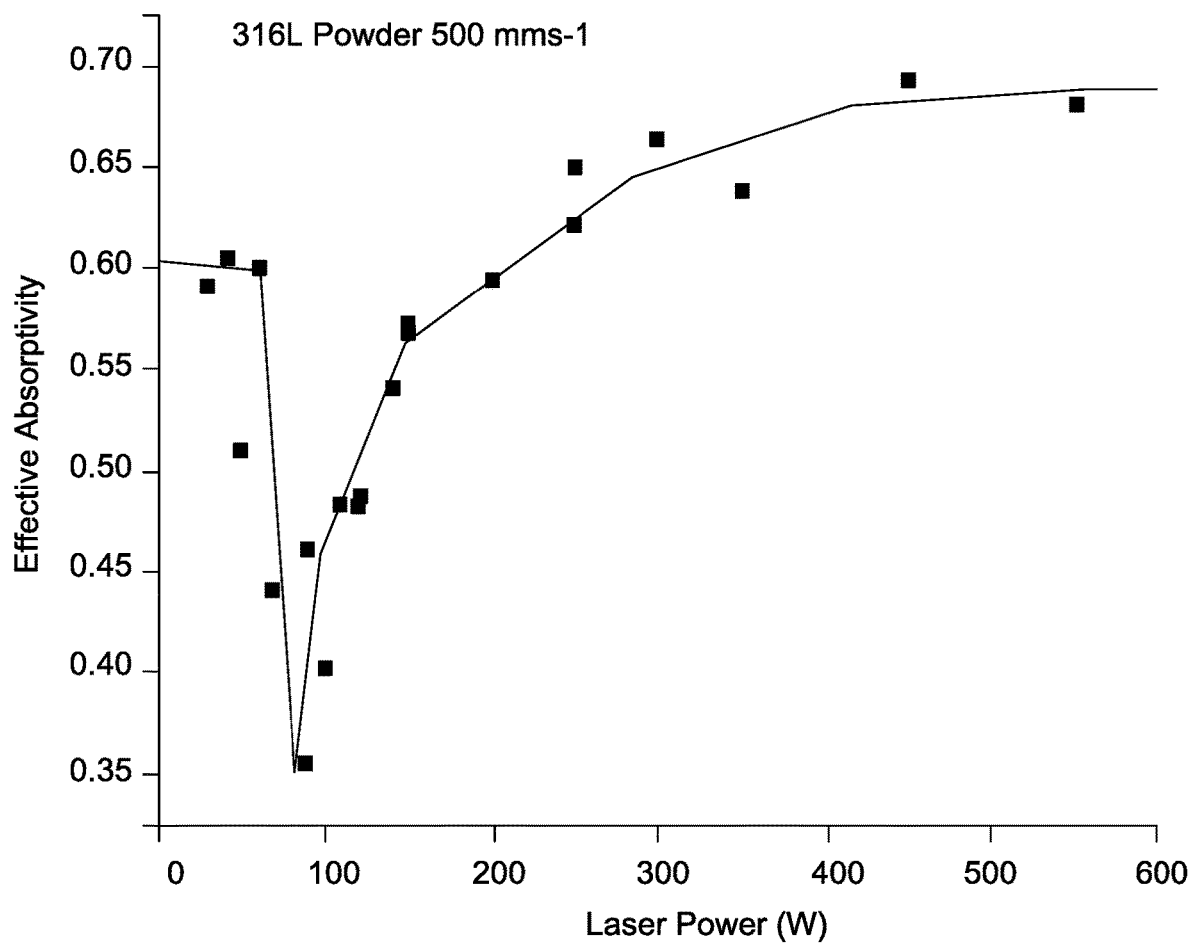

FIG. 3A is an insert corresponding to FIG. 3 which shows practically identical effective absorptivity values for one to five written tracks and different writing pattern as validation of the method of the present disclosure; and FIG. 4 is an example graph of the effective absorptivity of a powdered metal (e.g., 316L metal powder) on a flat substrate of the same material as a function of laser power.

Corresponding reference numerals indicate corresponding parts throughout the several views of the drawings.

DETAILED DESCRIPTION

Example embodiments will now be described more fully with reference to the accompanying drawings.

The present system and method provides an easy and effective way to measure absorptivity for the experimental situation of interest, in order to calibrate the net energy coupling for a laser PBFAM machine. The system and method, in its various configurations as described here, is compatible with existing PBFAM production machines and is expected to significantly improve process modeling results. The system and method can therefore be used to optimize the PBFAM machine operating parameters.

A system 10 for implementing one embodiment of the present disclosure is shown in FIG. 1. A container 12 is provided to hold a quantity of powdered material 14 and is preferably made from the same material as the powdered material 14. In one implementation the powdered material may be powdered plastic. In another implementation the powdered material may be powdered metal. In this example the container forms a disc, and will be referred to throughout the following discussion as "disc 12". The disc 12 forms a substrate having a rim 16 on its edge which has a height approximately height equal to, or just slightly higher than, the thickness of the layer of powdered material feed stock being used. When filling the disc 12 with the powdered material feed stock, any powder above the rim 16 may be removed using a suitable brush (not shown), or possibly with a blade of a roller which simulates a powder spreading action of an automated powder spreading component/system.

One or more thermocouples 18 may be inserted in the disc 12 for making local temperature measurements. For the purpose of the following discussion it will be assumed that a plurality of the thermocouples 18 is being used and that independent thermocouples within the plurality are spaced apart generally evenly over the cross sectional area of the disc 12. The plurality of thermocouples 18 may each have a sensing probe portion 18a which is disposed on or within a bottom wall 12a of the disc 12. The thermocouples 18 may have their probes spaced evenly apart over the cross sectional area of the bottom wall 12a of the disc 12 and may be viewed as forming a temperature sensing subsystem. The disc 12 may be placed in a thermo-isolated holder 20 made from, for example, porous alumina or any other suitable material. The thermo-isolated holder 20 may have a thermal conductivity at 25° C. of 0.14 W/mK, and may be obtained from various commercial sources, for example Foundry Service & Supplies, Inc. (Ontario, Calif.). Data measured by the thermocouples 18 may be transmitted by a wired connection or a wireless connection to an electronic processor based controller 21 having memory and an input/output subsystem, and processed by the controller 21 in real time.

The thermo-isolated holder 20, which may be made from porous alumina, has an upper portion 22 shaped to receive the disc 12 and is designed to minimize the conductive cooling of the sample-to-disc 12 to well below the convective heat losses. The thermo-isolated holder 20 may be supported on a table 24.

A laser 26, in this example a 600 W fiber laser, may be used to generate a suitable laser beam 28 having a desired wavelength. The laser 26 may be in communication with the controller 26 and a power output of the laser may be controlled by the controller 21 in real time in response to determined absorptivity, as will be discussed further below. The table 24 may be moved by a suitable translation subsystem (not shown) to enable the laser beam 28 to be scanned over the powdered material 14. Alternatively, the table 24 may be held stationary and the laser 26 may be moved; both implementations are contemplated by the present disclosure. Optionally, an infrared (IR) camera 29 may be included to image the powdered material 14 for the purpose of monitoring and/or verifying expected temperatures during the melting of the powdered material. If the IR camera 29 is included it may be coupled to the controller 21 or to a different processor/controller (not shown) to provide temperature related information that can further be used to monitor and control the manufacturing process.

In this example the laser beam 28 has a wavelength of 1070 nm, although this may be modified to suit the needs of a specific application. The laser 26 power output is selected/controlled to be sufficient to melt both the powdered material 14 and preferably the substrate as well, and may be varied as needed to suit specific applications and specific types of powdered materials. The disc 12 (or alternatively the table 24) may be moved while the laser beam 28 is directed at the disc to make a plurality of tracks on the disc surface, for example in a raster pattern, and the disc temperature may be detected by the thermocouples 18. For the disc 12 used in experiments, the thermal diffusion time through the disc was short but the equilibration across the disc was found to take up to 10 seconds for a low conductivity material like steel. Typical results for the measurements obtained are presented in the graphs of FIG. 2, which shows the recorded temperature changes for a 316L stainless steel plate. Curve 100 shows the temperature vs. time curve when the thermocouple is just under the track of the laser beam 28. Curve 102 shows the temperature vs. time curve with the thermocouple placed a few millimeters away from the track. Both curves merge after about 10 seconds, indicating uniform temperature across the sample.

Figure 2:
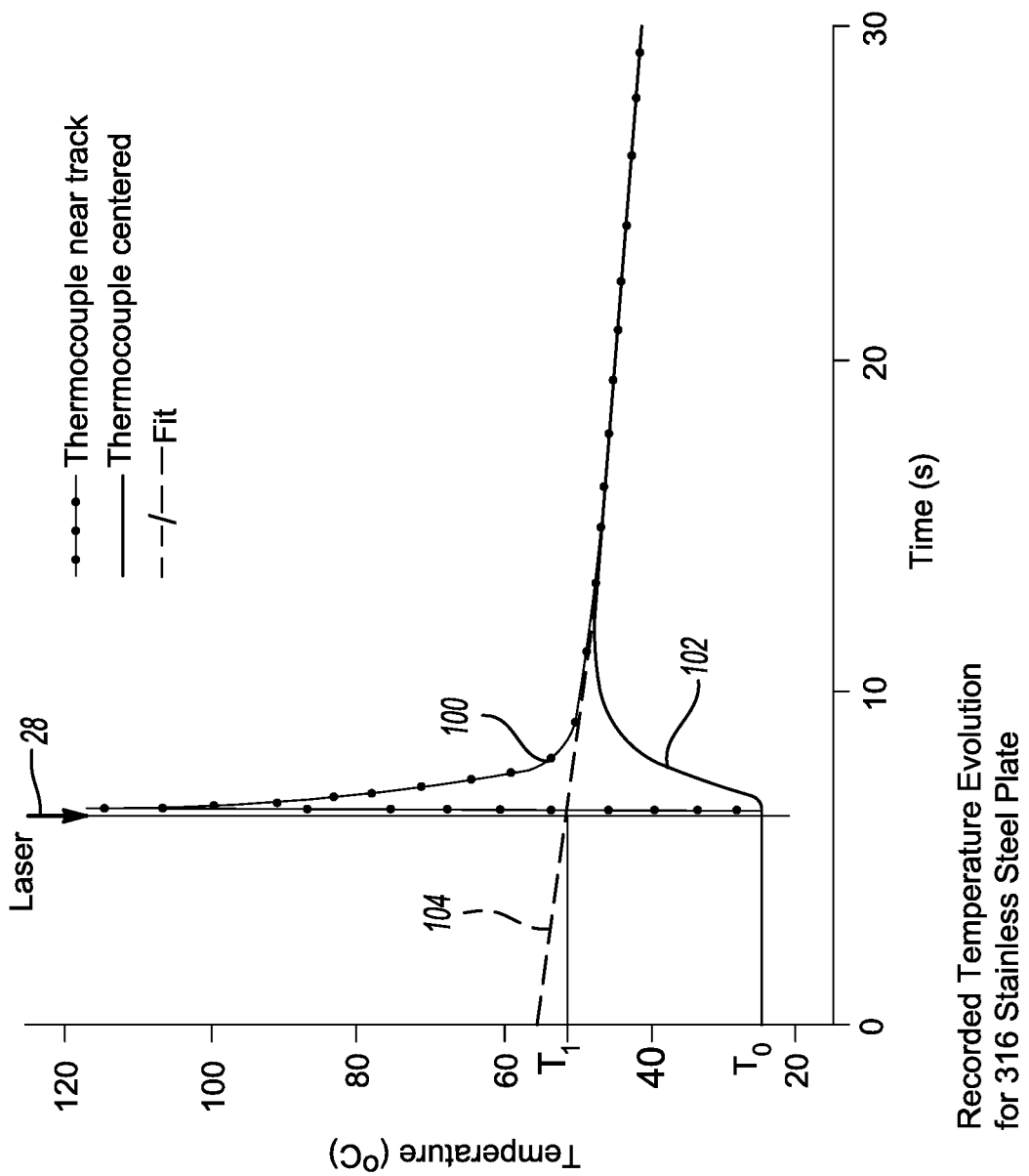
FIG. 2 is graph showing a plurality of temperature vs. time curves illustrating how the measured temperature of the container varies depending on whether a laser beam of the system of FIG. 1 tracks along a path which is centered over a thermocouple, or tracks along a path which is near the thermocouple.

Curve 104 in FIG. 2 shows the interpolation of the temperature to early time using analytical solution describing the convection losses. It can be seen that some temperature losses occur before the temperature equilibration over the disc 12 (presumed to be due to convection losses) takes place, resulting in a decrease in temperature of about 2% for 316L stainless steel. Due to the linear-in-time temperature decay characteristic, these losses can be compensated for during the data processing. For materials with better conductivity, the homogenization time is shorter and the convective losses are even less important. Once the disc 12 temperature increase ΔT after the temperature homogenization is known, then the effective absorptivity "A" can be found from the energy balance by the formula of Equation 1 below:

$$APL/u=mC_p\Delta T \quad \text{(Equation 1)}$$

Here "P" is the laser power, "L" is the total length of tracks, "u" is the scan velocity, and "m" is a disc mass with the powder layer. A typical disc 12 temperature increase was only a few tens of degrees and heat capacity $C_p$ can be taken at room temperature.

In FIG. 3 the absorptivity data can be seen to be insensitive to the laser beam 28 track writing pattern. FIG. 3 shows the effective absorptivity measurements vs. deposited energy (a.u.) for different track patterns of the laser beam. The FIG. 3 insert, labelled as FIG. 3A, shows practically identical effective absorptivity values for one to five tracks as validation of the method. Multiple measurements for the same number of tracks correspond to different track patterns or positions, respectively.

FIG. 4 shows a curve 200 illustrating example absorptivity measurements for steel 316L powdered material on a flat substrate at different laser power levels. At low laser power the absorptivity is high due to the multiple light reflection and absorption. Powder melting makes the surface smooth, thus increasing the reflectivity. When the melt boiling started the vapors' recoil pressure dig the key hole in the melt. Absorption in the channel walls increases the absorptivity. It can be seen that the absorptivity as a function of laser power changes by more than a factor of two, demonstrating the need for the direct absorptivity measurements. The implementation of the apparatus 10 in an actual PBFAM machine can include the thermo-insulated holder 20 made as a flat cylinder with a layer of powdered material deposited on the disc 12 top of the thermo-insulated holder. The thermocouples 18 may be configured to transfer temperature data via a wired connection or even wirelessly to the controller 21 for evaluation. The thermo-insulated holder 20 may be set up on the table 24 and the tracks are made by moving the laser. As a result, the absorptivity is measured exactly for the beam shape of the processing laser for the specific conditions of the material processing operation.

It will also be appreciated that the teachings of the present disclosure, as well as the apparatus 10, may be used with only minor modifications to carry out laser absorptivity measurements in laser welding processes. The difference in this implementation would be that the container 12 would be a flat disc without the rim 16 and the powdered material 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A powdered bed fusion additive manufacturing (PBFAM) apparatus comprising:
   a container for holding a quantity of powdered material, the container having a bottom wall constructed from the same material as the powdered material, for supporting the quantity of powdered material thereon;
   a temperature sensing subsystem coupled to a portion of the container for detecting a temperature of the container;
   a light source configured to generate an optical beam directed at the powdered material held by the container, to melt the powdered material; and
   a controller in communication with the temperature sensing subsystem and configured to determine an absorptivity of the powdered material, while the powdered material is being melted, based on information from the temperature sensing subsystem, and to use the determined absorptivity to control a power output of the light source in real time as the light source is generating the optical beam and melting the powdered material, to carry out a PBFAM operation.

2. The apparatus of claim 1, wherein the temperature sensing subsystem comprises a plurality of thermocouples.

3. The apparatus of claim 2, wherein the container forms a disc, and wherein the thermocouples have temperature sensing probes which are positioned on or which extend into, and which are spaced apart over, a cross sectional area of the bottom wall of the container.

4. The apparatus of claim 3, wherein the temperature sensing probes of the thermocouples are spaced apart evenly over the cross sectional area of the bottom wall of the disc.

5. The apparatus of claim 4, wherein the container comprises a disc having a rim for assisting in containing the powdered material.

6. The apparatus of claim 1, wherein the light source comprises a laser.

7. A powdered bed fusion additive manufacturing (PBFAM) apparatus comprising:
   a container for holding a quantity of powdered material, the container having a bottom wall for supporting the quantity of powdered material thereon, the bottom wall being constructed of the same material as the powdered material;
   a plurality of thermocouples having portions extending into the bottom wall of the container and adapted to sense a temperature of the container;
   a thermo-isolated holder for holding the container and made from a metal selected to minimize conductive cooling of the quantity of powdered material;
   a laser configured to generate an optical beam directed at the powdered material held by the container, the optical beam being sufficient in intensity to melt the powdered material; and
   a controller in communication with the thermocouples and configured to determine an absorptivity of the powdered material based on information received from the thermocouples, while the powdered material is being melted, wherein the controller is configured to use the determined absorptivity to adjust an output power of the laser while carrying out a PBFAM operation.

8. The apparatus of claim 7, wherein the container comprises a disc.

9. The apparatus of claim 7, wherein the thermocouples are spaced apart over the cross sectional area of the bottom wall of the container.

10. The apparatus of claim 7, wherein the controller is configured to adjust an output power of the laser depending on the determined absorptivity.

11. The apparatus of claim 7, wherein the thermo-isolated holder is comprised of porous alumina.

12. A method for performing powdered bed fusion additive manufacturing (PBFAM), the method comprising:
   using a container to hold a quantity of powdered material, the container having a bottom wall for supporting the quantity of powdered material thereon, the bottom wall being constructed of the same material as the powdered material;
   directing an optical beam at the powdered material held by the container, which is sufficient in temperature to melt the powdered material;
   while the powdered material is being melted, sensing a temperature of a portion of the container; and
   using a controller to receive the sensed temperature and to determine an absorptivity of the powdered material while the powdered is being melted; and
   using the controller to consider the determined absorptivity of the powdered material and to control a power output for the optical beam in real time as the optical beam is melting the powdered material to carry out a PBFAM operation.

13. The method of claim 12, wherein the directing an optical beam at the powdered material comprises directing a laser beam from a laser at the powdered material.

14. The method of claim 12, wherein sensing a temperature of a portion of the container comprises using a plurality of temperature sensing elements located at least one of:
   on a surface of the container; and
   at least partially within the container.

15. The method of claim 14, wherein using a plurality of temperature sensing elements comprises using a plurality of thermocouples to sense the temperature of the container at a plurality of locations on the container.

* * * * *